United States Patent
Müller et al.

(10) Patent No.: US 8,369,869 B2
(45) Date of Patent: Feb. 5, 2013

(54) METHOD, NODE, DEVICE, COMPUTER PROGRAM, AND DATA CARRIER FOR DETERMINING A POSITION OF A NODE IN AN AD-HOC NETWORK

(75) Inventors: Oliver Müller, München (DE); Alejandro Ramirez, München (DE)

(73) Assignee: Siemens Aktiengesellschaft, Munich (DE)

( * ) Notice: Subject to any disclaimer, the term of this patent is extended or adjusted under 35 U.S.C. 154(b) by 299 days.

(21) Appl. No.: 12/812,784

(22) PCT Filed: Dec. 22, 2008

(86) PCT No.: PCT/EP2008/068162
§ 371 (c)(1),
(2), (4) Date: Jul. 14, 2010

(87) PCT Pub. No.: WO2009/089989
PCT Pub. Date: Jul. 23, 2009

(65) Prior Publication Data
US 2011/0045844 A1    Feb. 24, 2011

(30) Foreign Application Priority Data

Jan. 14, 2008 (DE) .......................... 10 2008 004 257
Apr. 30, 2008 (DE) .......................... 10 2008 021 614

(51) Int. Cl.
*G01C 17/00* (2006.01)
(52) U.S. Cl. ..................................... 455/456.1; 702/150
(58) Field of Classification Search ................ 455/456.1; 702/150, 151, 179, 183
See application file for complete search history.

(56) References Cited

U.S. PATENT DOCUMENTS

2005/0288888 A1 * 12/2005 Ye et al. .................. 702/150

FOREIGN PATENT DOCUMENTS

| DE | 60110052 T2 | 5/2006 |
| GB | 2316580 | 2/1998 |
| WO | 2007072400 | 6/2007 |
| WO | WO/2007/072400 | * 6/2007 |

OTHER PUBLICATIONS

International Search Report and Written Opinion for Application No. PCT/EP2008/068162 (14 pages), Jun. 5, 2009.
Savarese et al., "Robust Positioning Algorithms for Distributed Ad-Hoc Wireless Sensor Networks" Delft University of Technology (11 pages), 2001.
Niculescu et al., "DV Based Positioning in Ad Hoc Networks" Telecommunication Systems 22. Nr. 1-4, S 267-280 (14 pages), 2003.

(Continued)

*Primary Examiner* — Ajit Patel
*Assistant Examiner* — Myron K Wyche
(74) *Attorney, Agent, or Firm* — King & Spalding L.L.P.

(57) ABSTRACT

In a method and a device for determining a geographical position of a node in an ad-hoc network, distance circles of at least two nodes that adjoin the node are determined. In addition, points of intersection between the distance circles of the at least two nodes adjoining the node are identified. A main set of points of intersection is determined from among the set of the identified or determined points of intersection, the main set comprising points of intersection located in the vicinity of an estimated position of the node. The geographical position of the node is then determined by the main set of points of intersection.

32 Claims, 10 Drawing Sheets

OTHER PUBLICATIONS

Hsieh et al., "Efficient Localization in Mobile Wireless Sensor Networks" Proceedings of the IEEE International Conference on Sensor Networks, Ubiquitous, and Trustworthy Computing (5 pages), 2006.

Savvides et al., "Dynamic Fine-Grained Localization in Ad-Hoc Networks of Sensors" Mobile Computing and networking, ACM (14 pages), 2001.

Savvides et al., "The Bits and Flops of the N-hop Multilateration Primitive for Node Localization Problems" Proceedings of the $1^{st}$ ACM International Workshop on Wireless Sensor Networks and Applications (10 pages), 2002.

Bergamo et al., "Localization in Sensor Networks with Fading and Mobility" Proceedings of IEEE PIMRC, Institute of Electrical and Electronics Engineers, Inc. (12 pages), 2002.

Bulusu et al., "GPS-less Low-Cost Outdoor Localization for Very Small Device" IEEE Personal Communications Magazine (7 pages), Oct. 1, 2000.

Whitehouse et al., "A Robustness analysis of Multi-hop Ranging-Based Localization Approximations" Proceedings of the Fifth international Conference on Information Processing in Sensor Electrical and Electronics Engineers (9 pages), Apr. 19, 2006.

Yoon et al., "Random Waypoint Considered Harmful" Proceedings of Infocom, Institute of Electrical and Electronics Engineers (10 pages), 2003.

Satyajayant et al., "CluRoL: Clustering based Robust Localization in Wireless Sensor Networks" Military Communications Conference IEEE, Piscataway, NJ (7 pages), Oct. 29, 2007.

Lin et al., "Mobile Location Estimation Based on Differences of Signal Attenuations for GSM Systems" IEEE Transactions on Vehicular Technology, IEEE Service Center, Piscataway NJ, US, vol. 54, Nr. 4 (8 pages), Jul. 1, 2005.

Sheu et al., "A Distributed Location Estimating Algorithm for Wireless Sensor Networks" Sensor Networks, Ubiquitous, and Trustworthy Computing, 2006. IEEE International Conference on Taichung, Taiwan (8 pages), Jun. 5, 2006.

Zoubir, "Backward Elimination and stepwise Regression Procedures for Testing Sensor Irrelevancy" Signals, Systems, and Computers 1993, 1993 Conference Record of the Twenty-seventh Asilomar Conference on Pacific Grove, CA. IEEE Computer Society, (5 pages), Nov. 1, 1993.

Langendoen et al., "Distributed Localization in Wireless Sensor Networks: A Quantitative Comparison" Computer Networks, Elsevier Science Publishers B.V. Amsterdam, NL vol. 43 Nr. 4 (20 pages), Nov. 15, 2003.

\* cited by examiner

METHOD, NODE, DEVICE, COMPUTER PROGRAM, AND DATA CARRIER FOR DETERMINING A POSITION OF A NODE IN AN AD-HOC NETWORK

CROSS-REFERENCE TO RELATED APPLICATIONS

This application is a U.S. National Stage Application of International Application No. PCT/EP2008/068162 filed Dec. 22, 2008, which designates the United States of America, and claims priority to DE Application No. 10 2008 004 257.9 filed Jan. 14, 2008 and DE Application No. 10 2008 021 614.3 filed Apr. 30, 2008. The contents of which are hereby incorporated by reference in their entirety.

TECHNICAL FIELD

The invention relates to the determination of geographical positions of nodes in an ad-hoc network. In particular the present invention relates to a method, a node, a device, a computer program and a data carrier that in each case enable geographical positions in an ad-hoc network to be determined according to the invention.

BACKGROUND

Nowadays many objects are able to communicate with other objects. That is to say, they are able to send and/or receive information, messages and data. The objects may be permanently installed, stationary or moving. In many situations such as in traffic (e.g. road or air traffic) or in warehouses etc. for example, coordination of such objects (such as vehicles, containers etc.) is useful. It is useful for instance to support safety or management.

In this context, the ability to include the objects in communication networks affords many ways of supporting the aforesaid safety or management. For instance, the objects can at least partially take on the coordination themselves. That is to say, by coordinating with other objects, by receiving position-relevant data and information, the objects can analyze the data and information provided and deduce their positioning in relation to other objects in the vicinity. The objects (hereinafter referred to as nodes) form a network, the purpose of which is to coordinate or position the objects, wherein this is performed at least in part by a corresponding system and/or at least in part by the objects or nodes themselves.

The literature describes various ways of relating the positions of individual nodes and the distances from or between the nodes. It is usually assumed that the network comprises two types of node. Firstly beacon nodes that know their own position, and secondly standard nodes that must calculate their position on the basis of the distances to the beacon nodes.

In terms of their approach, the known methods can be differentiated into non-distance based and distance-based approaches.

In the case of non-distance based approaches, the distance of the individual network nodes is determined using a hop metric (i.e. using the number of other nodes lying between two nodes), and in a further step is converted into geographical distances on the basis of the network topology represented in this way. There is no explicit measurement of the distances between the nodes. These approaches include for example works of the prior art such as Niculescu and Nath [1] as well as, on the basis of the latter, Hsieh and Wang [2].

In the case of distance-based approaches on the other hand, the position of the individual node is estimated with the aid of direct distance measurements between individual network nodes, or between nodes and beacons respectively. Examples of such location-finding methods are, inter alia, [3], [4] and [5]. In [6], an attempt is made to calculate a position estimate with the RSSI (received signal strength indication) of the signals received from the beacon nodes.

Distance-based position determination will be considered below.

The distance is usually calculated using a range or distance calculation method. All in all, a wide variety of methods are used to determine the distance or the range. For instance, measurements can be performed based on the strength of the received signal (received signal strength, RSS), the time of arrival (ToA), the time difference of arrival (TDoA), or roundtrip time of flight (RToF) etc. in order to determine or calculate the range or distance. The problem with all these methods is the inaccuracy of the measurements. That is to say they do not permit any exact range or distance values to be calculated or determined. The result of such measurements is an inexact or estimated range or distance value.

Since distance-based approaches are based on distance specifications, they must be robust in relation to such inexact or estimated range or distance values.

The following two methods for position determination have recently become established among distance-based approaches: multilateration (LSL) [7] and bounding box methods (BB) [5], [8].

FIG. 1a illustrates a method according to the prior art (trilateration) for position determination. In particular FIG. 1a shows how trilateration works when three nodes or neighbors $B_1$, $B_2$, $B_3$ are in the vicinity.

Here the measured distances $d_1$, $d_2$ and $d_3$ from neighboring nodes $B_1$, $B_2$, $B_3$ to the node M to be located are used to estimate the position of M.

Since it is based on a mathematically exact method that does not allow for errors, trilateration is highly prone to errors, both with respect to the positions of the beacon nodes and to the accuracy of the measured distances. As explained above, however, the problem lies in the fact that in practice the measured distances are always estimated and therefore inexact values.

FIG. 1b shows the typical problems encountered when multilateration is used for location-finding. When the range measurements are not perfect and exact, the position is calculated incorrectly. Multilateration is an extended form of trilateration. Whereas trilateration can determine the position of a node with three neighboring nodes, all the available neighboring nodes of the node to be located are used for multilateration.

With multilateration it is possible to estimate the position of the unknown node M from the measured distances $d_1+d_{err,1}$, $d_2+d_{err,2}$ and $d_3+d_{err,3}$ of multiple neighboring nodes $P_1$, $P_2$, $P_3$ to the unknown node M and their known position. Compared with trilateration, multilateration can also handle inexact position or distance measurements. In FIG. 1b the estimated positions $P_{estim,1}$, $P_{estim,2}$, $P_{estim,3}$ deviate from the real positions of the nodes $P_1$, $P_2$, $P_3$. Moreover, the measured distances $d_1+d_{err,1}$, $d_2+d_{err,2}$ and $d_3+d_{err,3}$ contain errors $d_{err,1}$, $d_{err,2}$, $d_{err,3}$. Accordingly, it can be seen from FIG. 1b that the calculated position $M_{estim}$ deviates from the actual or true position of the node M.

Multilateration has however the disadvantage that it is very prone to error if there is multicollinearity of the neighboring nodes. An error in position determination by means of multilateration is further amplified if there are also errors in the input data (the positions of the neighboring nodes and the corresponding distances). Consequently, even small input errors can cause or produce very large errors in the calculated result position. Another known method is the bounding box method [5], [8] which permits the location-finding of nodes in a network as soon as range measurements can be performed. FIG. 2a shows an example of this method when the measurements are very exact. This method is based on the assumption that the presumed position of a node can be enclosed with the respective measured distances in a rectangular area (the minimum bounding box), the midpoint of which then represents the estimated position. In FIG. 2a the node M to be located has three neighboring nodes $P_1$, $P_2$, $P_3$. Here the enclosing areas or boxes are determined by the positions $(x_1, y_1)$, $(x_1, y_1)$, $(x_1, y_1)$ of the neighboring nodes $P_1$, $P_2$, $P_3$ and the distances $d_1, d_2, d_3$ of the neighboring nodes to the node M to be located. $M_{estim}$ is the estimated position of the node M.

The bounding box method provides quite good results if the neighboring nodes lie around the node to be located. Problems arise however when the node to be located has neighbors on one side only (i.e. only on the right, only on the left, or only above, etc.). FIG. 2b illustrates this problem, i.e. the extent of problems the method can have if the user has no neighbors in one direction or on one side (e.g. at the perimeter of the network). In such situations the bounding box method is not able to capture or enclose the node to be located. This results in seriously incorrect estimates of the position of the node to be located. As a consequence, the calculated position $M_{estim}$ and the actual position of the node M to be located are very far apart.

SUMMARY

According to various embodiments, improved position determination can be provided.

According to an embodiment, a method for determining a geographical position of a node in an ad-hoc network, may comprises:—determining distance circles of at least two neighboring nodes of the node;—determining points of intersection of the distance circles of the at least two neighboring nodes of the node;—determining a main set of points of intersection, wherein the main set contains points of intersection that are in the vicinity of an estimated position of the node; and—determining the geographical position of the node by means of the main set of points of intersection.

According to a further embodiment, for every neighboring node of the at least two neighboring nodes a distance circle of the neighboring node can be determined by means of a position specification of the neighboring node and a distance specification. According to a further embodiment, the distance specification can be an inexact distance specification. According to a further embodiment, the position specification can be an inexact position specification. According to a further embodiment, the position specification can be supplied by a GPS measurement. According to a further embodiment, the position specification can be an exact position specification. According to a further embodiment, the distance specification can be determined by means of a distance measuring method. According to a further embodiment, According to a further embodiment, the points of intersection of the distance circles can be determined based on a subtraction and a transformation of circle equations of two distance circles in each case. According to a further embodiment, a threshold value can be used when determining the main set of points of intersection, and points of intersection that lie within the threshold can be used to calculate the end result. According to a further embodiment, mean values of x and y components of the points of intersection can be used to determine the main set of points of intersection. According to a further embodiment, the main set of points of intersection can be determined by means of a reverse regression. According to a further embodiment, the method can be performed by the node. According to a further embodiment, the node can be a mobile node of the ad-hoc network. According to a further embodiment, the node can be a vehicle.

According to another embodiment, a node in an ad-hoc network may have means for determining a geographical position of the node which are designed:—to determine distance circles of at least two neighboring nodes of the node;—to determine points of intersection of the distance circles of the at least two neighboring nodes of the node;—to determine a main set of points of intersection, wherein the main set contains points of intersection that are in the vicinity of an estimated position of the node; and—to determine the geographical position of the node by means of the main set of points of intersection.

According to a further embodiment of the node, the means for determining a geographical position of the node can be designed to determine, for every neighboring node of the at least two neighboring nodes, a distance circle of the neighboring node by means of a position specification of the neighboring node and a distance specification. According to a further embodiment of the node, the node may have means for receiving the position specification of the neighboring node. According to a further embodiment of the node, the distance specification can be an inexact distance specification. According to a further embodiment of the node, the position specification can be an inexact position specification. According to a further embodiment of the node, the position specification can be a position specification supplied by a GPS measurement. According to a further embodiment of the node, the position specification can be an exact position specification. According to a further embodiment of the node, the distance specification can be a distance specification determined by means of a distance measuring method. According to a further embodiment of the node, the means for determining a geographical position of the node can be designed to determine the points of intersection of the distance circles based on a subtraction and a transformation of circle equations of two distance circles in each case. According to a further embodiment of the node, the means for determining a geographical position of the node can be designed to use a threshold value when determining the main set of points of intersection and to use the points of intersection that lie within the threshold to calculate the end result. According to a further embodiment of the node, the means for determining a geographical position of the node can be designed to use mean values of x and y components of the points of intersection to determine the main set of points of intersection. According to a further embodiment of the node, the means for determining a geographical position of the node can be designed to determine the main set of points of intersection by means of a reverse regression. According to a further embodiment of the node, the node can be a mobile node of the ad-hoc network. According to a further embodiment of the node, the node can be a vehicle.

According to yet another embodiment, a device may have means for determining a geographical position of a node in an ad-hoc network, wherein the means are designed:—to determine distance circles of at least two neighboring nodes of the node;—to determine points of intersection of the distance circles of the at least two neighboring nodes of the node;—to determine a main set of points of intersection, wherein the main set contains points of intersection that are in the vicinity of an estimated position of the node; and—to determine the geographical position of the node by means of the main set of points of intersection.

According to yet another embodiment, a computer program may comprise coding designed to execute the steps of the method as described above.

According to a further embodiment of the computer program, the computer program can be stored on a data carrier.

According to yet another embodiment, a data carrier may have a computer program described above.

BRIEF DESCRIPTION OF THE DRAWINGS

The invention will be explained in detail below with reference to exemplary embodiments as illustrated in the attached figures, in which.

DETAILED DESCRIPTION

Figure 1A:
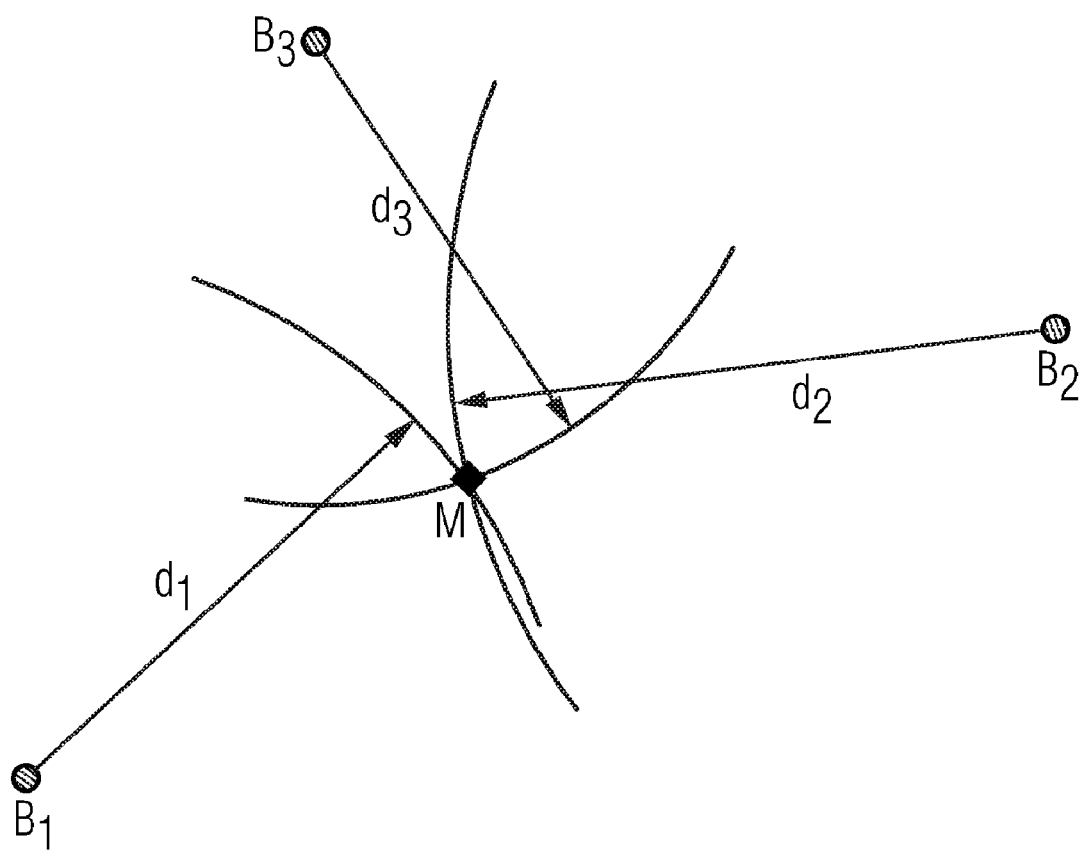
FIG. 1a illustrates a method according to the prior art (trilateration) for position determination.
Figure 1B:
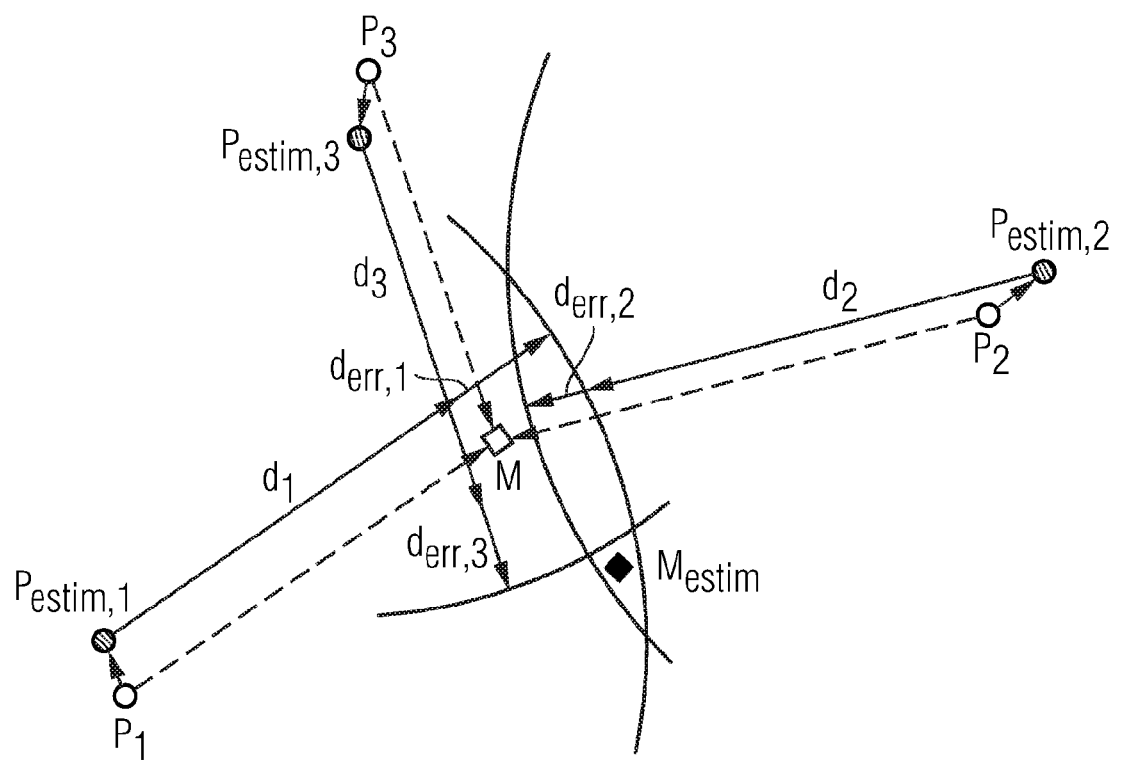
FIG. 1b illustrates a method according to the prior art (multilateration) for position determination and makes clear the disadvantages of the method.
Figure 2A:
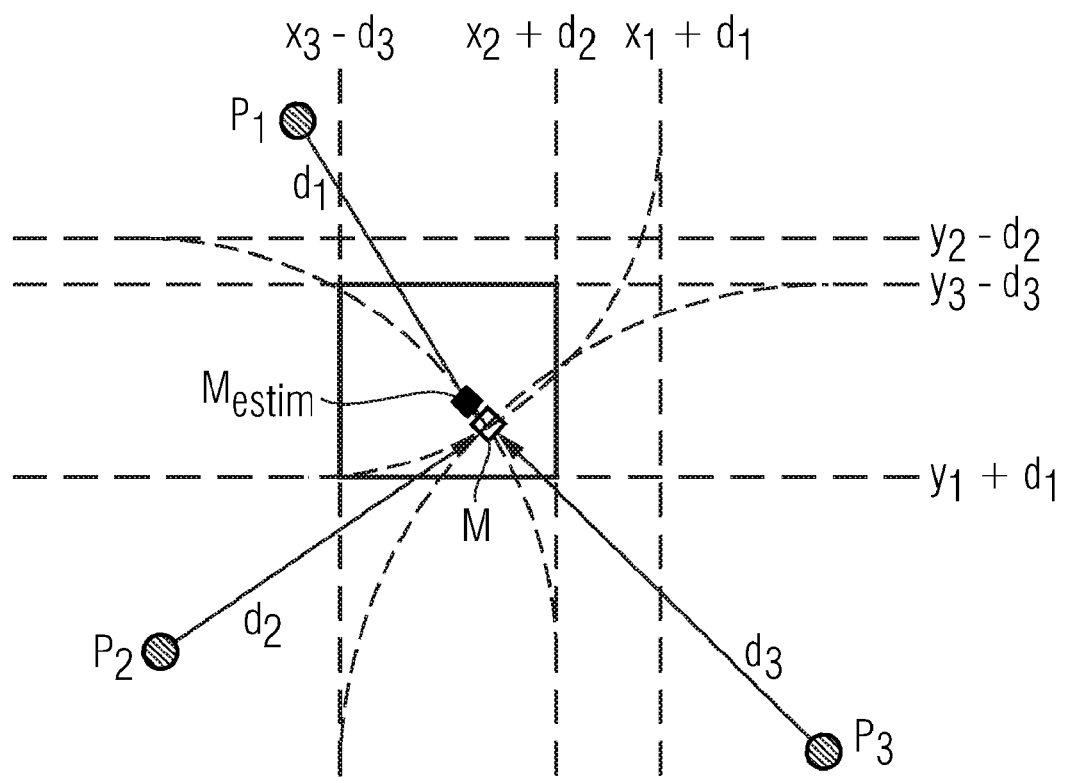
FIG. 2a illustrates a method according to the prior art (bounding box method) for position determination.
Figure 2B:
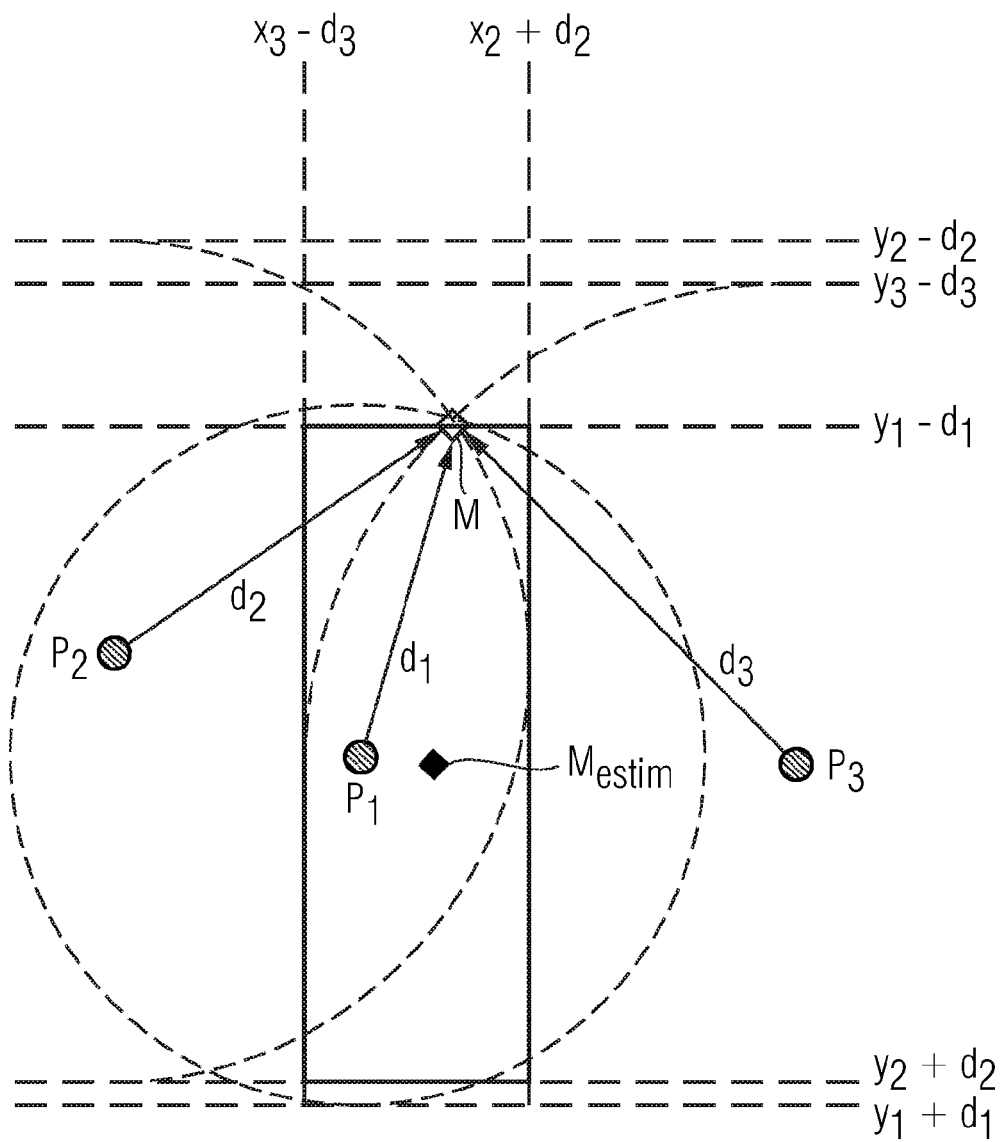
FIG. 2b illustrates a method according to the prior art (bounding box method) for position determination and makes clear the disadvantages of the method.

The object is achieved by a method for determining a geographical position of a node in an ad-hoc network, wherein the method has the following steps:
  determining distance circles of at least two neighboring nodes of the node;
  determining points of intersection of the distance circles of the at least two neighboring nodes of the node;
  determining a main set of points of intersection, wherein the main set contains points of intersection that are in the vicinity of an estimated position of the node; and
  determining the geographical position of the node by means of the main set of points of intersection.

A distance circle is a circle around a given node with a predetermined radius d. In the present case, the radius is the distance between a neighboring node and the node to be located or the node whose position is being determined respectively. As already mentioned above, the distance is determined or calculated using a range or distance calculation method. The present invention is not restricted here to any one range or distance calculation method. A wide variety of methods can be used to determine the distance (e.g. RSS, ToA, TDoA, RToF etc.), and a combination of these methods is also possible. The various embodiments thus permits flexible implementation.

Points of intersection are the points at which two or more distance circles intersect.

The positions of the neighboring nodes can be predetermined or estimated, and consequently may be inexact (e.g. from a global positioning system GPS). In this respect, too, the various embodiments permit flexible implementation and can be used in various situations.

The various embodiments enable the position to be calculated in all directions, in particular because circles are also used as search objects. Moreover, position determination by means of the points of intersection of the distance circles permits firstly fast and effective, and secondly significantly more exact determination of the position of a node in comparison with the known methods of the prior art.

For every neighboring node of the at least two neighboring nodes it is possible to determine a distance circle of the neighboring node by means of a position specification of the neighboring node and a distance specification. The distance specification indicates the distance between the neighboring node and the node whose position is to be determined or calculated according to various embodiments. In the text below said node is also referred to as the node to be located.

The distance specification may be an inexact distance specification here. That is to say, the position determination of a node according to various embodiments is prepared for inexact distance specifications and possesses a tolerance for errors.

Furthermore, the position specification may also be an inexact position specification. The various embodiments thus also have error tolerance with regard to specifications of the positions of other nodes. This may be the case for example if the position specifications are supplied by GPS measurements.

In addition, the position specification may also be an exact position specification. For example, the position data to the neighboring nodes can be specified by means of precise or exactly functioning measuring methods or may also be predetermined. The latter will be the case, for example, if the object representing a neighboring node is permanently installed or attached.

As already explained, the distance specification can be determined by means of a distance measuring method.

It is further possible to determine the points of intersection of the distance circles based on a subtraction and a transformation of circle equations of two distance circles in each case.

In this case, when determining the main set of points of intersection, it is possible to use a threshold value and to use the points of intersection that lie within the threshold value (e.g. ones that do not exceed said threshold value) to calculate the end result.

According to one exemplary embodiment, mean values of x and y components of the points of intersection can be used to determine the main set of points of intersection.

According to one exemplary embodiment, the main set of points of intersection can furthermore be determined by means of a reverse regression.

The method can furthermore be performed by the node whose geographical position is being determined.

The node may be a mobile node of the ad-hoc network. It may be a vehicle in a traffic network for example.

The above-mentioned object is solved by a node in an ad-hoc network, wherein the node has means for determining a geographical position of the node, wherein the means for determining a geographical position of the node are designed:
- to determine distance circles of at least two neighboring nodes of the node;
- to determine points of intersection of the distance circles of the at least two neighboring nodes of the node;
- to determine a main set of points of intersection, wherein the main set contains points of intersection that are in the vicinity of an estimated position of the node; and
- to determine the position of the node by means of the main set of points of intersection.

Overall, the node, and hence the means for determining a geographical position of the node, is designed to perform the steps of the method which was outlined above and which will be described in more detail below.

The means for determining a geographical position of the node are designed to determine, for every neighboring node of the at least two neighboring nodes, a distance circle of the neighboring node by means of a position specification of the neighboring node and a distance specification.

The node may have means for receiving the position specification of the neighboring node. That is to say, in such a case, the node can receive the position specifications of the neighboring node on request.

According to one exemplary embodiment, the distance specification may be an inexact distance specification.

The position specification may be an inexact position specification. Thus the position specification may be a position specification supplied by a GPS measurement for example. The position specification may however also be an exact position specification. This is the case, for example, if the position specification relates to a fixed node installed in the network.

Furthermore, the distance specification can be a distance specification determined by means of a distance measuring method.

According to one exemplary embodiment, the means for determining a geographical position of the node may be designed to determine the points of intersection of the distance circles based on a subtraction and a transformation of circle equations of two distance circles in each case.

In addition, the means for determining a geographical position of the node can be designed to use a threshold value when determining the main set of points of intersection and to use the points of intersection that lie within the threshold to calculate the end result.

Furthermore, the means for determining a geographical position of the node may be designed to use mean values of x and y components of the points of intersection to determine the main set of points of intersection.

According to one exemplary embodiment, the means for determining a geographical position of the node may be designed to determine the main set of points of intersection by means of a reverse regression.

The node may be a mobile node of the ad-hoc network. Thus, the node may be a vehicle for example.

The above-mentioned object is also achieved by a device having means for determining a geographical position of a node in an ad-hoc network, wherein the means are designed:
- to determine distance circles of at least two neighboring nodes of the node;
- to determine points of intersection of the distance circles of the at least two neighboring nodes of the node;
- to determine a main set of points of intersection, wherein the main set contains points of intersection that are in the vicinity of an estimated position of the node; and
- to determine the geographical position of the node by means of the main set of points of intersection.

Overall, the device is configured in such a way that it performs the steps of the method which was outlined above and which is described in more detail below.

The device may be installed anywhere in the ad-hoc network. For instance, it may be included in a node of the ad-hoc network. In particular, it may be part of a node whose geographical position is to be determined. That is to say, it can for example be built into a vehicle of a traffic network if the node is a vehicle which performs position determination directly in the vehicle and thus contributes to coordination of the traffic, i.e. the safety or management of the traffic network.

The above-mentioned object is also achieved by a computer program with coding designed to execute the steps of the method which was outlined above and which is described in more detail below. The computer program may be stored on a data carrier.

In addition, the above-mentioned object is achieved by a data carrier having the above-mentioned computer program.

The present invention will be described below using the example of a traffic network in which, for the sake of simplicity, vehicles are viewed as objects or nodes of the (traffic) network respectively. Note that the application of the present invention is not limited to a traffic network, but that there are also other possible applications for the present invention. Various objects or devices may serve as objects or nodes of a network.

Figure 3:
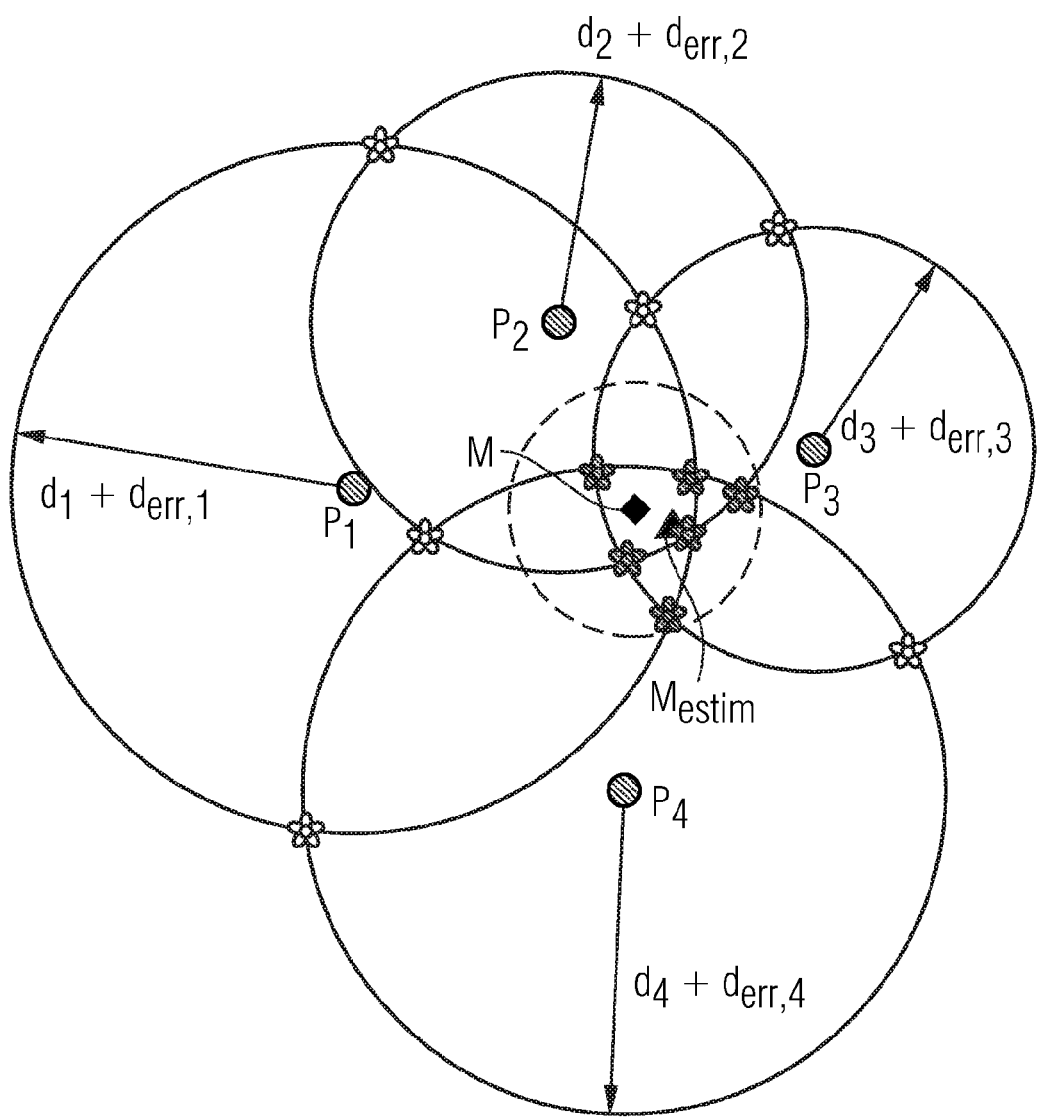
FIG. 3 illustrates position determination according to one exemplary embodiment.

FIG. 3 illustrates position determination according to one exemplary embodiment.

The network here comprises nodes $P_1$, $P_2$, $P_3$, $P_4$ and M, where M is the node to be located, that is to say the node for which the position determination is being performed, and where nodes $P_1$, $P_2$, $P_3$, $P_4$ are neighboring nodes of the node M. The network may be, for example, a traffic network in which nodes $P_1$, $P_2$, $P_3$, $P_4$ and M represent vehicles. The vehicles can communicate with each other here and can avoid critical traffic situations by determining their position based on the positions of vehicles in the vicinity and/or of other objects in the traffic network and by appropriate communication with the vehicles in the vicinity and or with other objects in the traffic network. The application of the present invention is however by no means limited solely to such traffic situations or to traffic as a whole. The present invention is flexibly designed and can be used in various areas in which it is necessary to perform tasks relating to the positioning and/or coordination of objects.

Distance information $d_1+d_{err,1}$, $d_2+d_{err,2}$, $d_3+d_{err,3}$, $d_4+d_{err,4}$, with respect to the distance or range between the node M to be located and the respective neighboring node $P_1$, $P_2$, $P_3$, $P_4$ exists respectively for each of the neighboring nodes $P_1$, $P_2$, $P_3$, $P_4$. Since the range or distance determination methods only supply an estimate and not an exact specification of a distance between two nodes, the distance information available to the nodes is inexact. Consequently, the present distance information $d_i + d_{err,i}$ comprises the actual distance $d_i$ and the error $d_{err,i}$ arising from the estimate. The values of the errors $d_{err,i}$ are real numbers. As a result the value of $d_{err,i}$ may be either positive or negative. For the sake of clarity, the errors $d_{err,i}$ in FIG. 3 have positive values.

According to the present exemplary embodiment, points of intersection of the distance circles of the neighboring nodes are calculated separately for each possible pair of neighbors of a node. The main set of said points of intersection will be in the vicinity of the actual position of the node to be located. The final result position of the node M to be located will then be calculated from said main set of estimated positions of the points of intersection.

The points of intersection of the distance circles of neighboring nodes $P_1$ and $P_2$ of a node M to be calculated or located can be found as set out below.

The distance circles of $P_1$ and $P_2$ are considered to be circle equations:

$$(x-x_1)^2 + (y-y_1)^2 = d_1^2 \tag{1}$$

$$(x-x_2)^2 + (y-y_2)^2 = d_2^2 \tag{2}$$

$(x_i, y_i)$ is the position of the node $P_i$ here. The position specification $(x_i, y_i)$ may be an estimated or inexact position specification, or may also be an exact or precise position specification. $(x, y)$ is the position of the node M to be located.

By means of subtraction and transformation of the circle equations (1) and (2), the following equation is obtained:

$$y(2y_2 - 2y_1) = 2x(x_1 - x_2) + (d_1^2 - d_2^2) + (x_2^2 - x_1^2) + (y_2^2 - y_1^2) \tag{3}$$

After a further transformation the following equation is obtained:

$$y = x\frac{x_1 - x_2}{y_2 - y_1} + \frac{(d_1^2 - d_2^2) + (x_2^2 - x_1^2) + (y_2^2 - y_1^2)}{2y_2 - 2y_1} \tag{4}$$

Following substitution by the parameters $P_1$ and $P_2$, where:

$$p_1 = \frac{x_1 - x_2}{y_2 - y_1} \tag{5}$$

and $$p_2 = \frac{(d_1^2 - d_2^2) + (x_2^2 - x_1^2) + (y_2^2 - y_1^2)}{2y_2 - 2y_1} \tag{6}$$

the equation of the straight lines is obtained from the points of intersection of the distance circles of $P_1$ and $P_2$:

$$y = P_1 * x + P_2 \tag{7}$$

In the next step the equation (1) is transformed into:

$$y = \pm\sqrt{d_1^2 - (x-x_1)^2} + y_1 \tag{8}$$

and is then equated to the equation of the straight lines through the points of intersection of the distance circles of $P_1$ and $P_2$ (7):

$$P_1 x + P_2 = y = \pm\sqrt{d_1^2 - (x-x_1)^2} + y_1 \tag{9}$$

After squaring the equation (9), the following equation is obtained:

$$P_1^2 x^2 + 2P_1 x(P_2 - y_1) + (P_2 - y_1)^2 = d_1^2 - x^2 + 2xx_1 - x_1^2 = 0 \tag{10}$$

A further transformation produces the equation:

$$x^2(P_1^2 + 1) + x(2P_1(P_2 - y_1) - 2x_1) + (P_2 - y_1)^2 - d_1^2 - x_1^2 = 0 \tag{11}$$

The parameters $q_1$, $q_2$ and $q_3$ are further inserted into the equation (11), where:

$$q_1 = P_1^2 + 1 \tag{12}$$

$$q_2 = 2P_1(P_2 - y_1) - 2x_1 \tag{13}$$

$$q_3 = (P_2 - y_1)^2 - d_1^2 - x_1^2 \tag{14}$$

Finally, by inserting parameters $q_1$, $q_2$ and $q_3$ into the equation (11), the quadratic formulation is obtained:

$$q_1 x^2 - q_2 x + q_3 \tag{15}$$

with the solution:

$$x_{1,2} = \frac{-q_2 \pm \sqrt{q_2^2 - 4q_1 q_3}}{2q_1} \tag{16}$$

The set of points of intersection of the distance circles of two neighbors of a node can thus finally be obtained or found by calculating the parameters $P_1$, $P_2$ and $q_1$, $q_2$ and $q_3$. The solution set can contain none, one or two points.

In total, given a set of n neighboring nodes of M, $$\sum_{i=1}^{n-1} i = \frac{n(n-1)}{2} \tag{17}$$

different pairings are possible. As a rule two points of intersection are generated from each neighboring pair of a node. One of these points of intersection can be in the vicinity of the node M to be located, while the other point of intersection can be far away from M. In order to eliminate the points of intersection that are far away from the position of the node M to be located, it is expedient to introduce a threshold or a threshold value from which more distant points of intersection no longer contribute to the result (the position of M to be located). The threshold value indicates for example a maximum range or a maximum distance permitted between two points of intersection. In this way a main set of points of intersection is calculated or captured which contains points of intersection that are in the vicinity of the actual position or the position to be located respectively of the node M to be located. According to the present exemplary embodiment, this is accomplished on the basis of the own measured position of the point to be located. According to various embodiments, the use of further existing clustering methods is also possible here. For instance, a selection by means of a reverse regression would also be conceivable.

All points lying within the threshold are used to calculate the end result, i.e. the position of M to be located.

This can now be determined for example by calculating the mean values of the x and y components of the positions $$\bar{x} = \frac{\sum_{i=1}^{n_{intersects}} x_i}{n_{intersects}} \tag{18}$$

and

-continued $$\bar{y} = \frac{\sum_{i=1}^{n_{intersects}} y_i}{n_{intersects}} \quad (19)$$

respectively.

According to the present exemplary embodiment therefore, all x values of all points of intersection are summed and the total is divided by the number of points of intersection. The y values are also treated analogously. Therefore all y values of all points of intersection are summed and the total is divided by the number of points of intersection. A central point between the points of intersection is thus obtained.

All points of intersection are considered from said central point of the points of intersection, it being determined for every point of intersection whether the distance between the central point and the point of intersection is below the predetermined threshold value. If so, the point of intersection is included in the set of all points of intersection and is consequently considered for the further position determination.

As already mentioned, FIG. 3 illustrates how the approach of the present invention proceeds according to an exemplary embodiment. Here all points of intersection of the respective neighboring pairs being considered are calculated and a dataset is then selected for the end result (here on the basis of a fixed radius around the measured position of M). The mean value of said points of intersection forms the result position of the node M to be located.

The set of all points of intersection is indicated by stars in FIG. 3. In this figure the empty or white stars indicate the points of intersection that are not used for calculating or determining the result position of the node M to be located. The filled or black stars in turn indicate the points of intersection of the main set of points of intersection, that is to say the points of intersection that are not [sic] used for calculating or determining the result position of the node M to be located.

According to various embodiments, the location-finding problem is divided into individual estimates. This confers the advantage that single strong outliers can be simply and effectively excluded from the final position estimate.

Various embodiments can furthermore effectively counter and handle the multicollinearity which causes problems for position determination in the known methods. According to various embodiments a clustering of the points of intersection is performed, as described above, for example by averaging the points of intersection calculated. As a result, a significantly more exact estimate is obtained.

In the case where the node M to be located is collinear with its neighbors, accuracy is further improved by the position determination according to various embodiments because the points of intersection of the distance circles are then almost symmetrical perpendicular to the line. Consequently the mean value of the points of intersection assumes approximately the real or actual position of the node M to be located.

As already mentioned, various embodiments relate to methods of the second category, that is to say to distance-based methods, since it is assumed that at least approximate distance measurements are available as input data.

The distances between the nodes can be measured for example using distance or range calculation methods that incorporate the propagation time. As already mentioned, the present invention is not limited to such distance or range calculation methods. For instance, other methods can also be employed or used, for example methods based on ultrasound measurements, light measurements or measurements using radio waves. The present invention generally assumes that a distance or range calculation method supplies information about the distance between a node to be located and at least one neighboring node of the node to be located, where it is expected that the range or distance information may not necessarily be exact. This does not of course preclude the use of exact range or distance information. This ensures an error tolerance with respect to the distance calculated between the node to be located and the neighboring node.

One important difference from the known methods is that the known methods necessarily differentiate between beacon nodes and normal nodes, that is to say between nodes whose position is either known or completely unknown. According to various embodiments, the neighboring nodes can have position estimation in the form of GPS measurements or other position measurements and/or exact position specifications. According to various embodiments such estimates are used in a cooperative manner for determining the position more precisely.

A further advantage with respect to methods according to the prior art is the proportion of beacon nodes in the network as well as the density of the network. A relatively high proportion of beacon nodes is assumed (5-10%) in known methods. The present invention enables position determination even in networks having a relatively low proportion of beacon nodes since, in relation to the total number of nodes, e.g. vehicles in traffic, the number of RSUs whose exact position is known tends to be low. Its neighboring nodes, that is to say the nodes lying within its radio range, therefore serve as a reference for determining the position of a node. If one considers the example of a traffic network, the number of vehicles tends to be small in a WAVE network for example, and the density can also vary widely. The topology is constantly changing, not least because of its mobile nature.

Furthermore, for position determination according to various embodiments it is not necessary to divide the nodes into the categories of beacon or non-beacon nodes, which is a prerequisite in the known methods. Overall the nodes can be designated as general network nodes (e.g. vehicles) or as RSU nodes (e.g. road-side units). The first category has only an inexact measurement of its own position, for example by GPS, and is mobile. The second category has an exact position specification, but is consequently immobile. Nodes that are within each other's radio range are referred to as neighboring nodes. Categorization into the aforesaid first category and aforesaid second category is not essential here. Nodes of both categories or else nodes of one of the categories may be present.

The results of the position determination of the aforesaid methods according to the prior art and those of the method according to various embodiments will be compared below. To obtain an initial overview of the three methods (multilateration, bounding box method and method according to various embodiments), they will first be examined in a model that, although abstract, is generally used for analyzing mobile networks, the random waypoint (RWP) model. In this model, a given number of mobile network nodes move in an enclosed rectangular field.

An exact description of the RWP model is provided in [9] for example.

Figure 4:
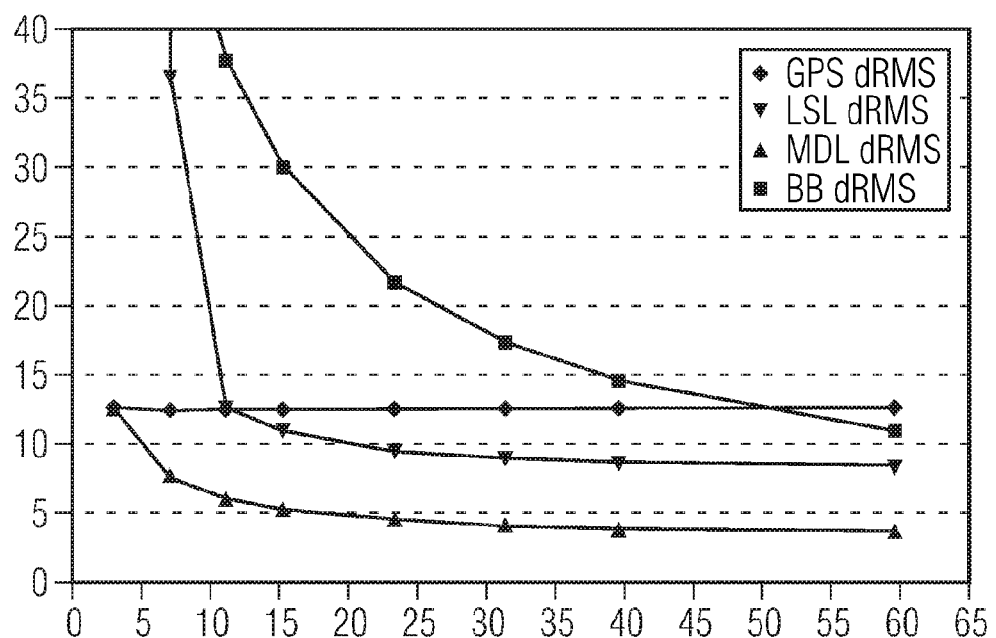
FIG. 4 shows a comparison of the results of the method according to various embodiments and those of the methods according to the prior art, wherein the mean dRMS of the methods is given in the RWP model.

FIG. 4 shows a comparison of the results of the method according to various embodiments and those of the methods according to the prior art (least squares multilateration, multilateration, and bounding box methods), wherein the mean dRMS of the methods is given in the RWP model.

In addition to the results of the three methods, the measured dRMS of the GPS input data was also shown for comparison.

This is approximately 12.5 m throughout. At first glance it can already be seen from FIG. 4 that in the case where there are only a few neighbors per node both the least squares multilateration (LSL) and the bounding box (BB) methods produce a very poor position estimate. The corresponding dRMS values are therefore also not recorded by the diagram.

In FIG. 4 the vertical axis indicates the measured dRMS and the horizontal axis indicates the number of neighboring nodes. Only the method according to various embodiments (referred to below as multidilateration, MDL) can improve the accuracy of the input data when there is only a low number of neighbors. While LSL achieves an improvement from around 11 neighboring nodes, BB only achieves this when a high number of around 50 neighbors is reached. In the case of LSL, this is due (as explained above) on the one hand to the great influence of outliers, especially if there are only a few neighbors, which is then expressed in a poor approximation. This effect arises above all at the perimeter of the network. In the case of BB on the other hand, the generally poor performance at the perimeter of the network is responsible for the high dRMS, but also for generally poor performance in this simulation model.

In order to illustrate these differences in more detail, 50 snapshots of the state of the overall network were statistically evaluated. The total number of nodes was 20 in each case. The following metric was used to be able to distinguish between nodes at the perimeter and nodes in the center of the network: for every node the number of nodes that are further from the center of the simulation field than the node itself is determined. This metric or this number respectively is indicated on the horizontal axis of FIG. 5. The vertical axis of FIG. 5 indicates the measured dRMS.

Figure 5:
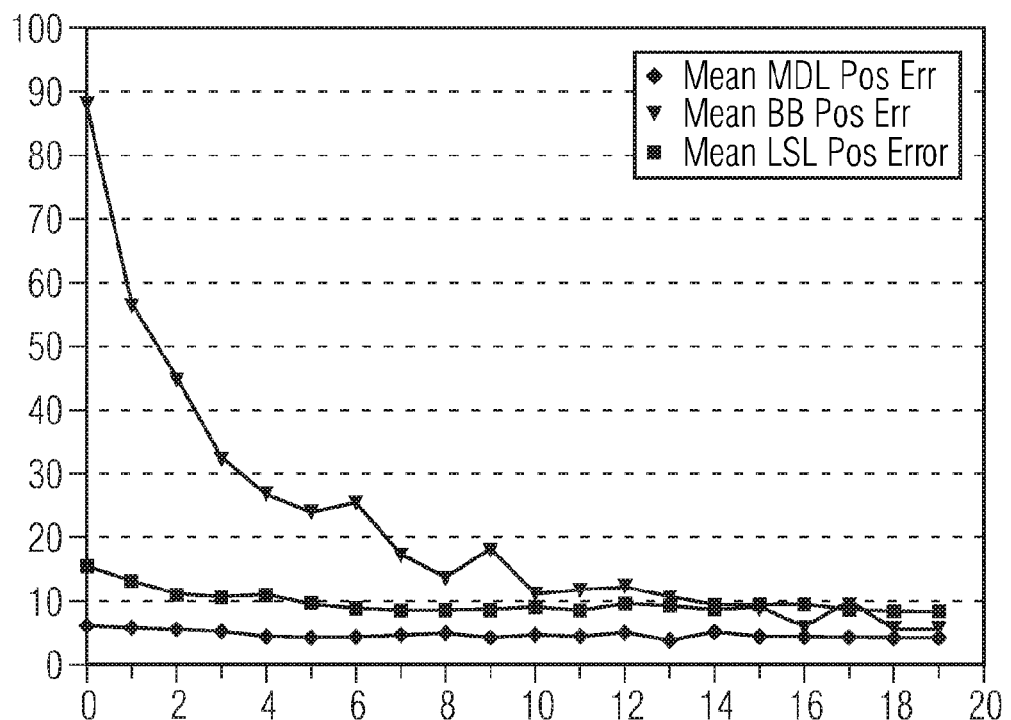
FIG. 5 shows a further comparison of the results of the method according to various embodiments and those of the methods according to the prior art, wherein the mean dRMS of the methods is given in the RWP model and wherein the comparison of the methods is represented using neighboring nodes that are further from the center.

It can be seen in FIG. 5 that BB has a very high level of inaccuracy at the network perimeter. Owing to the already relatively high number of neighbors per node, LSL achieves significantly better values, but here too an increased dRMS can be observed for perimeter nodes in particular.

Overall it can be said that MDL works best in this environment. Even with very few neighboring nodes, good position estimation accuracy which is clearly below the accuracy of the input data of 12.5 m can be seen.

By averaging the points of intersection of the neighboring distance circles, a good estimate is obtained even at the perimeters of the network since, in contrast to BB for example, there is no minimization of the greatest distances.

The present invention will be considered below with reference to the example of a convoy simulation.

Following the general RWP scenario, more specific applications of the methods will now be discussed. For this purpose, the following motion pattern was selected for the nodes as vehicles in road traffic:

The number of network nodes is no longer fixed, but variable. They are introduced into the simulation with a definable equally distributed occurrence probability.

A newly occurring node appears at a defined point at the edge of the simulation field and moves within a given corridor in X or Y direction towards the opposite side of the simulation field. It moves only in the specified direction, "reversing" is not possible. In each motion step, a sideways motion is also performed, the deflection of which is evenly distributed in the interval [−2.5 m, 2.5 m].

If a node exits the simulation field, the node is deleted.

Figure 6:
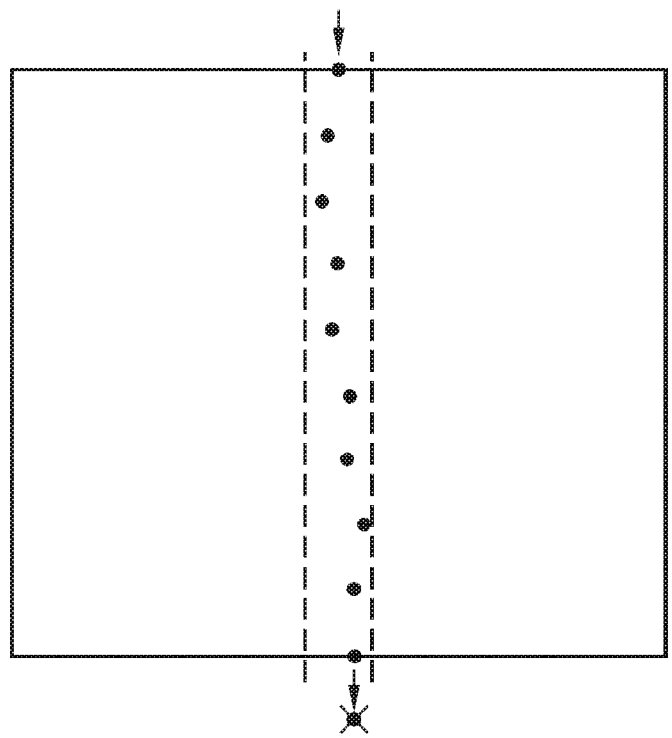
FIG. 6 shows a diagram of a convoy simulation.

FIG. 6 shows a diagram of this scenario.

Figure 7:
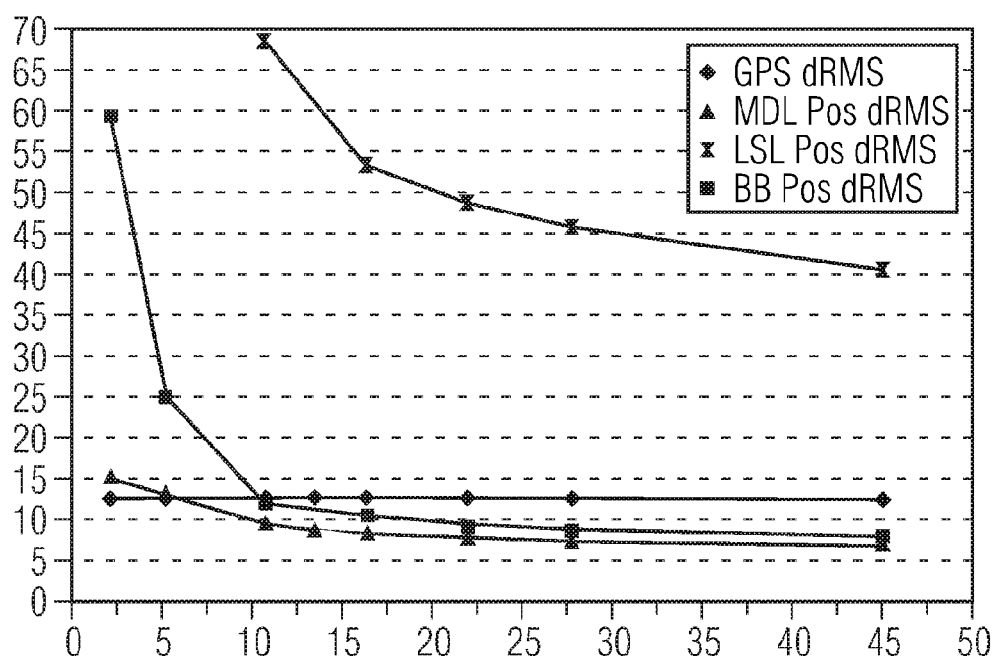
FIG. 7 shows a comparison of the results of the method according to various embodiments and those of the methods according to the prior art with respect to the diagram in FIG. 6 with mean dRMS.

As can be seen from the graph in FIG. 7, the performance of the methods in this scenario has in some cases clearly changed in comparison with the RWP simulation. In this case the vertical axis indicates the mean dRMS and the horizontal axis indicates the number of neighboring nodes.

While the BB method clearly showed the worst performance in the RWP scenario, here LSL assumes this position. One circumstance is particularly noteworthy here: at least with a high number of neighbors, under RWP BB achieved a further improvement of the position estimate in comparison with the GPS accuracy. By contrast, in the current scenario LSL remains clearly above the threshold. Even with a further significantly increased network density, according to the data position no improvement of the position can be expected.

Figure 8:
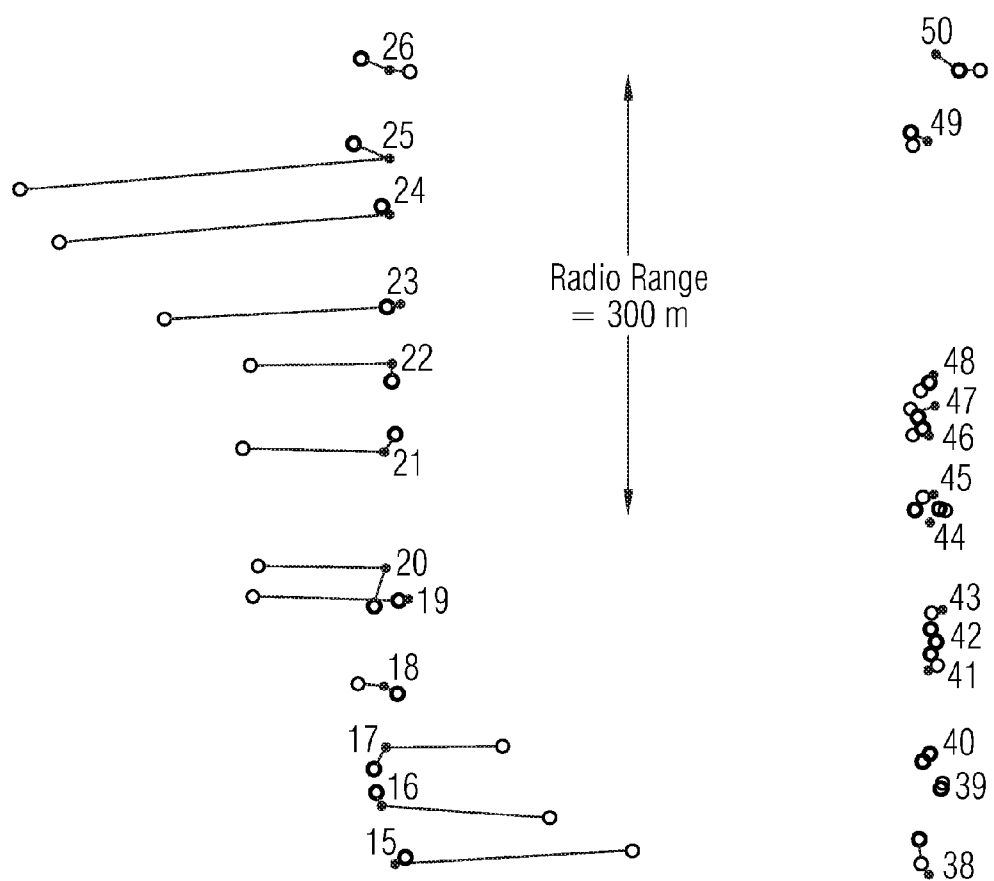
FIG. 8 shows a section of a simulation field with a convoy simulation with least squares multilateration (LSL) and the method according to various embodiments (MDL)

In the case of LSL, the reason for the poor values resides in the concept of the scenario. Since all node positions are virtually fully multicollinear, very large errors occur in the least squares analysis. A screenshot of this scenario illustrates this (see FIG. 8, section of the simulation field).

The left-hand side of the picture shows a screenshot of LSL and the right-hand side is shown with MDL for comparison. The large positioning errors for LSL can clearly be seen. Since the imaginary line through the positions runs in the Y direction, the location-finding errors in the X direction are very large. The LSL method is consequently entirely unsuited to this type of scenario.

Even if MDL achieves the best results, the overall performance is however worse than in the RWP scenario. Whereas in that case it was possible to achieve a location-finding dRMS of less than 5 m given a high node density, the minimum here is around 7 m. For large numbers of neighbors, the MDL method is only slightly better than BB.

The present invention will be explained below with reference to the example of a junction simulation.

While the above situation of a moving convoy is more suited to mapping motorways or country roads, in the following a typical urban scenario is described, namely the situation of a junction.

In principle this scenario does not differ greatly from the convoy scenario, as two corridors simply cross orthogonally to each other. Nevertheless, clear differences are produced in the network topology because new neighbor relationships naturally arise between the nodes in the two corridors.

Figure 9:
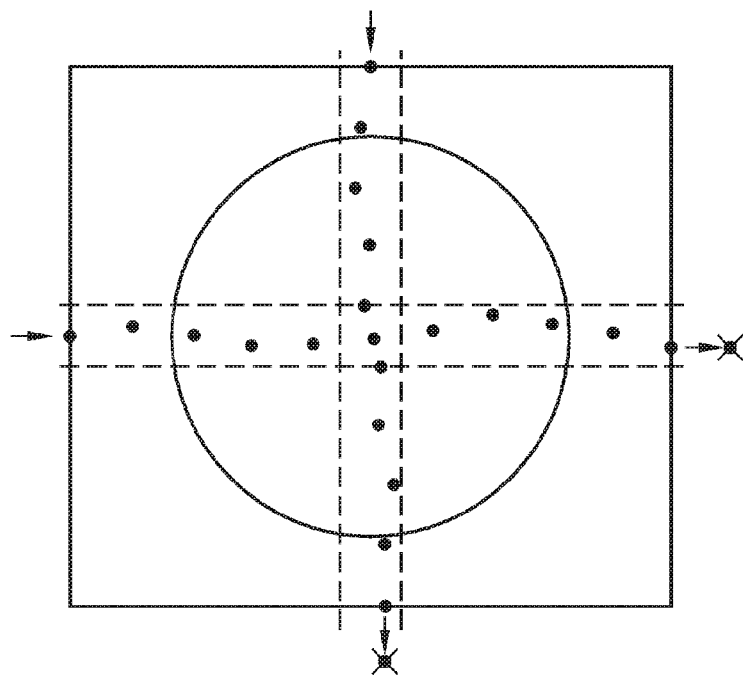
FIG. 9 shows a diagram of a junction simulation.

FIG. 9 shows a schematic diagram of the scenario.

Figure 10:
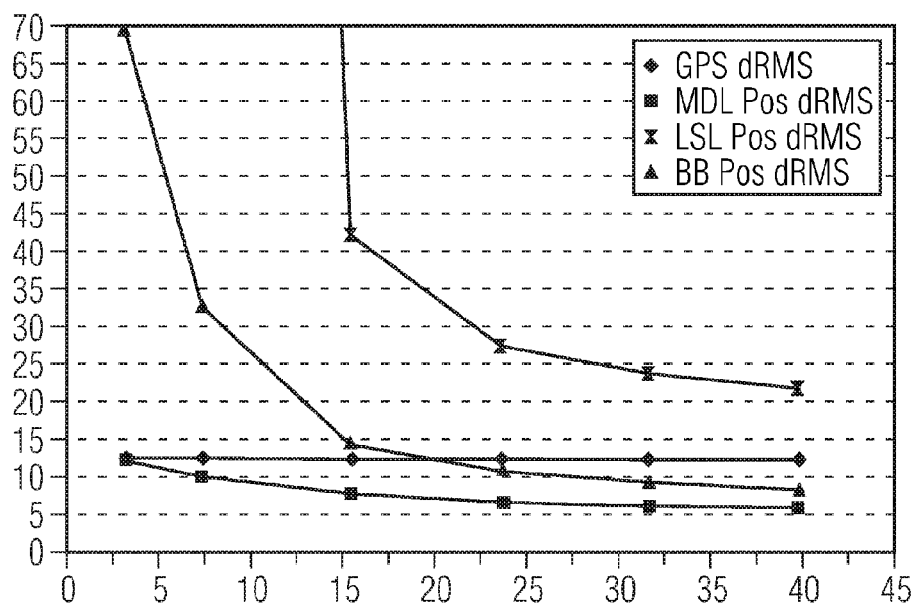
FIG. 10 shows the results of a junction simulation, wherein a mean dRMS of the method according to various embodiments and of the methods according to the prior art is given in the junction model.

FIG. 10 shows the mean dRMS of the network with the various methods over the mean number of neighbors per node. That is to say, the vertical axis indicates the mean dRMS and the horizontal axis indicates the number of neighboring nodes.

Here, too, the LSL method is clearly worse than the other two. Although it performs better than in the previous scenario, even with a high node density its mean dRMS is clearly above that of the GPS position measurement. The improvement is attributable to the fact that there are now further nodes present as neighbors within the circle described in FIG. 9 which are not collinear with the neighbors in the same corridor. Since these new neighbors also have a high level of mutual collinearity, however, the improvement is not as great as desired.

In comparison with the convoy scenario, the BB method on the other hand offers no improvement. In the case of few neighbors per node, the dRMS is clearly higher, and still significantly higher given a high density. An improvement of the dRMS in comparison with the dRMS from the GPS measurement is only achieved given a set of around 20 neighboring nodes on average, while this is already the case with around 11 neighbors in the convoy scenario. It would appear that BB achieves the best performance in the pseudo one-dimensional scenario of the almost collinear convoy. As soon as neighbors with different positions in both coordinate components come into the calculation, as is the case here, the values become worse.

The performance of the MDL method is the best in this scenario too. In comparison with the convoy scenario, the dRMS has even improved slightly, in particular where the number of neighbors is low. Even with high node densities, in contrast to the convoy simulation there is evidently now a significant difference between MDL and BB.

Figure 11:
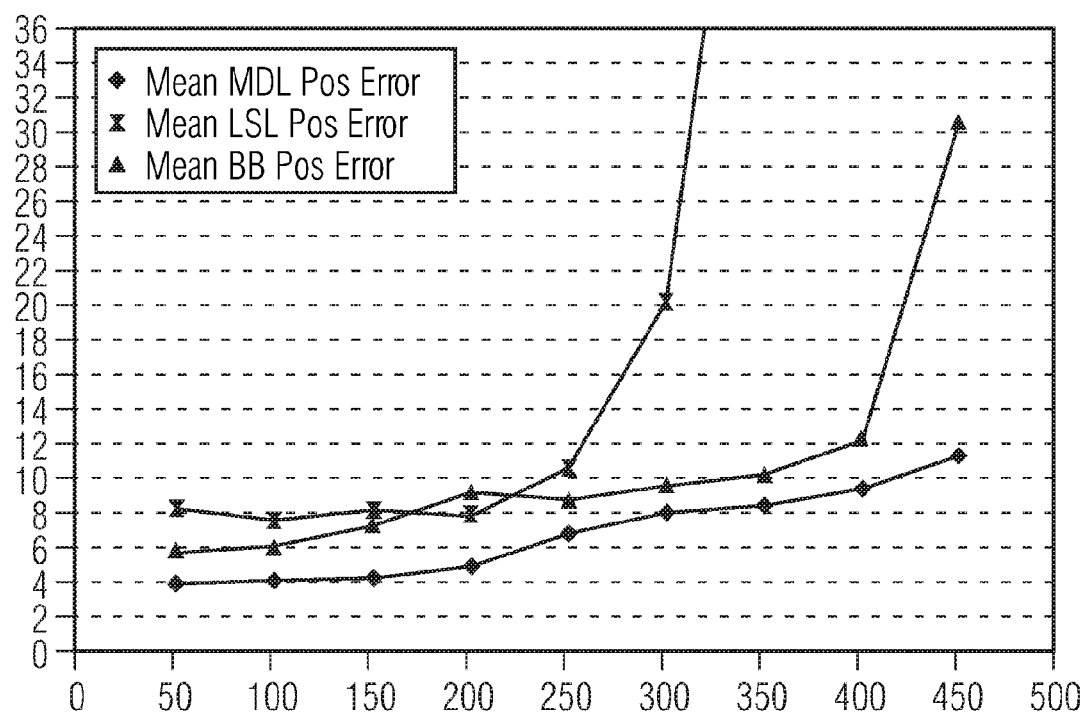
FIG. 11 shows the results of the junction simulation, wherein the dRMS of the method according to various embodiments and of the methods according to the prior art is shown as a function of the distance to the middle of the junction.

As already mentioned, different numbers of neighbors arise depending on the distance to the middle of the junction, and consequently also different qualities of position estimates. Particularly the accuracy in the direct vicinity of the junction is of interest. FIG. 11 plots the dRMS (on the vertical axis) of the methods as a function of the distance (on the horizontal axis). The data illustrated were calculated from over 50 snapshots.

It is clear that in the direct vicinity of the junction, all three methods perform well, with MDL achieving an average dRMS of 4 m in a radius of 0-50 m around the midpoint, and the other two 6-8 m. All three methods then gradually perform less well as the distance increases linearly. The performance of LSL then drops sharply at 250-300 m—since there is no longer any connection to the nodes of the intersecting corridor, the results become similarly poor to those of the convoy scenario. BB has good values up to the outer perimeter of the network, even if it does not achieve the quality of MDL. The dRMS then rapidly decreases however, which again points to the known problem of BB with nodes at the margin.

In summary, multidilatoraction [sic] (MDL) is preferred for determining positions more precisely not only in vehicle networks for the methods simulated in the scenarios described above using the software created for this purpose. In all the scenarios tested, MDL achieved the best performance. MDL is the least prone to the problems of multicollinearity cited. In most cases it proved possible to achieve greater precision with MDL even in networks having a low neighbor density.

The present invention relates to the determination of a geographical position of a node in an ad-hoc network. In order to do so, distance circles of at least two neighboring nodes of the node are determined. Furthermore, points of intersection of the distance circles of the at least two neighboring nodes of the node are calculated. From the set of points of intersection calculated or determined, a main set of points of intersection is determined, wherein the main set contains points of intersection that are in the vicinity of an estimated position of the node. The geographical position of the node is then determined by means of the main set of points of intersection.

Accordingly, all points of intersection of the respective neighboring pairs are calculated. From this a dataset (of points of intersection) is selected for the end result (e.g. on the basis of a fixed radius (predetermined by a threshold value for example) around the measured position of the node to be located). The midpoint of said points of intersection forms the result position, that is to say the position of the node to be located.

Although the present invention is explained above with reference to the embodiment shown in the attached drawings, clearly the invention is not restricted to this embodiment, but rather can be modified within the scope of the inventive idea disclosed above and in the attached claims. Naturally there may also be other embodiments that represent the principle of the invention and are equivalent, and consequently various modifications may be implemented without deviating from the scope of the invention. Thus, for instance, not all neighboring nodes need be considered in order to calculate the position of a node. This is not always expedient in particular in the case of large numbers of nodes, but in many cases a predetermined or predefined number of neighboring nodes is also sufficient to calculate the position according to the invention. Furthermore, different clustering methods may be used to calculate the main set of points of intersection. In addition, the present invention is not dependent in any way on a given range or distance calculation method. Rather the results of various range or distance calculation methods available can be used. Furthermore, the information about positions of the neighboring nodes may be inexact and/or exact information.

REFERENCES

[1] NICULESCU, Dragos; NATH, Badri: DV Based Positioning in Ad Hoc Networks. In: Telecommunication Systems 22 (2003), No. 1-4, pp. 267-280
[2] HSIEH, Yi-Ling; WANG, Kuochen: Efficient Localization in Mobile Wireless Sensor Networks. In: Proceedings of the IEEE International Conference on Sensor Networks, Ubiquitous, and Trustworthy Computing (2006), pp. 292-297
[3] SAVARESE, C.; RABAY, J.; LANGENDOEN, K.: Robust Positioning Algorithms for Distributed Ad-Hoc Wireless Sensor Networks. Delft University of Technology, 2001
[4] SAVVIDES, Andreas; HAN, Chih-Chieh; STRIVASTAVA, Mani B.: Dynamic fine-grained localization in Ad-Hoc networks of sensors. In: Mobile Computing and Networking, ACM, 2001, pp. 166-179
[5] SAVVIDES, A.; PARK, H.; SRIVASTAVA, M.: The Bits and Flops of the N-Hop Multilateration Primitive for Node Localization Problems. In: Proceedings of the 1st ACM International Workshop on Wireless Sensor Networks and Applications, ACM, 2002, pp. 112-121
[6] BERGAMO, P.; MAZZINI, G.: Localization in sensor networks with fading and mobility. In: Proceedings of IEEE PIMRC, Institute of Electrical and Electronics Engineers, Inc., 2002, pp. 750-754
[7] BULUSU, N.; HEIDEMANN, J.; ESTRIN, D.: GPS-less Low Cost Outdoor Localization for Very Small Devices. In: IEEE Personal Communications Magazine 7 (2000), No. 5, pp. 28-34
[8] WHITEHOUSE, Kamin; CULLER, David E.: A robustness analysis of multihop ranging-based localization approximations. In: Proceedings of the Fifth International Conference on Information Processing in Sensor Networks, 2006, pp. 317-325
[9] YOON, J.; LIU, M.; NOBLE, B.: Random Waypoint Considered Harmful. In: Proceedings of INFOCOM, Institute of Electrical and Electronics Engineers, Inc., 2003

What is claimed is:
1. A method for determining a geographical position of a node in an ad-hoc network, wherein the method comprises:
   determining distance circles of at least two neighboring nodes of the node;
   determining points of intersection of the distance circles of the at least two neighboring nodes of the node;
   determining a main set of points of intersection, wherein the main set comprises a subset of the points of intersection and includes points of intersection that are in the vicinity of an estimated position of the node, wherein the main set of points of intersection is determined by:
   determining a metric for each point of intersection; and determining whether to include each point of intersection in the main set of points of intersection based on the determined metric for that point of intersection;

such that the number of points of intersection included in the main set of points of intersection is variable and not predetermined by the number of the neighboring nodes; and determining the geographical position of the node by means of the main set of points of intersection.

2. The method as claimed in claim 1, wherein for every neighboring node of the at least two neighboring nodes a distance circle of the neighboring node is determined by means of a position specification of the neighboring node and a distance specification.

3. The method as claimed in claim 2, wherein the distance specification is an inexact distance specification.

4. The method as claimed in claim 2 wherein the position specification is an inexact position specification.

5. The method as claimed in claim 4, wherein the position specification is supplied by a GPS measurement.

6. The method as claimed in claim 2, wherein the position specification is an exact position specification.

7. The method as claimed in claim 2, wherein the distance specification is determined by means of a distance measuring method.

8. The method as claimed in claim 1, wherein the points of intersection of the distance circles are determined based on a subtraction and a transformation of circle equations of two distance circles in each case.

9. The method as claimed in claim 1, wherein a threshold value is used when determining the main set of points of intersection, and wherein points of intersection that lie within the threshold are used to calculate the end result.

10. The method as claimed in claim 9, wherein mean values of x and y components of the points of intersection are used to determine the main set of points of intersection.

11. The method as claimed in claim 9, wherein the main set of points of intersection is determined by means of a reverse regression.

12. The method as claimed in claim 1, wherein the method is performed by the node.

13. The method as claimed in claim 1, wherein the node is a mobile node of the ad-hoc network.

14. The method as claimed in claim 1, wherein the node is a vehicle.

15. A node in an ad-hoc network, wherein the node has means for determining a geographical position of the node which are designed:

to determine distance circles of at least two neighboring nodes of the node;

to determine points of intersection of the distance circles of the at least two neighboring nodes of the node;

to determining a main set of points of intersection, wherein the main set comprises a subset of the points of intersection and includes points of intersection that are in the vicinity of an estimated position of the node, wherein the main set of points of intersection is determined by:

determining a metric for each point of intersection; and determining whether to include each point of intersection in the main set of points of intersection based on the determined metric for that point of intersection;

such that the number of points of intersection included in the main set of points of intersection is variable and not predetermined by the number of the neighboring nodes; and to determine the geographical position of the node by means of the main set of points of intersection.

16. The node as claimed in claim 15, wherein the means for determining a geographical position of the node are designed to determine, for every neighboring node of the at least two neighboring nodes, a distance circle of the neighboring node by means of a position specification of the neighboring node and a distance specification.

17. The node as claimed in claim 16 wherein the node has means for receiving the position specification of the neighboring node.

18. The node as claimed in claim 16, wherein the distance specification is an inexact distance specification.

19. The node as claimed in claim 16, wherein the position specification is an exact position specification.

20. The node as claimed in claim 16, wherein the position specification is a position specification supplied by a GPS measurement.

21. The node as claimed in claim 16, wherein the position specification is an exact position specification.

22. The node as claimed in claim 16, wherein the distance specification is a distance specification determined by means of a distance measuring method.

23. The node as claimed in claim 15, wherein the means for determining a geographical position of the node are designed to determine the points of intersection of the distance circles based on a subtraction and a transformation of circle equations of two distance circles in each case.

24. The node as claimed in claim 15, wherein the means for determining a geographical position of the node are designed to use a threshold value determining the main set of points of intersection and to use the points of intersection that lie within the threshold to calculate the end result.

25. The node as clamed in claim 24, wherein the means for determining a geographical position of the node are designed to use mean values of x and y components of the points of intersection to determine the main set of points of intersection.

26. The node as claimed in claim 24, wherein the means for determining a geographical position of the node are designed to determine the main set of points of intersection by means of a reverse regression.

27. The node as claimed in claim 15, wherein the node is a mobile node of the ad-hoc network.

28. The node as claimed in claim 15, wherein the node is a vehicle.

29. A computer program product comprising a non-transitory computer readable medium storing instructions which when executed on a computer perform the steps of:

determining distance circles of at least two neighboring nodes of the node;

determining points of intersection of the distance circles of the at least two neighboring nodes of the node;

determining a main set of points of intersection, wherein the main set comprises a subset of the points of intersection and includes points of intersection that are in the vicinity of an estimated position of the node, wherein the main set of points of intersection is determined by:

determining a metric for each point of intersection; and determining whether to include each point of intersection in the main set of points of intersection based on the determined metric for that point of intersection;

such that the e number of joints of intersection included in the main set of points of intersection is variable and not predetermined by the number of the neighboring nodes; and determining the geographical position of the node by means of the main set of points of intersection.

30. The method as claimed in claim 1, wherein the main set of points of intersection is determined by:
   for each point of intersection:
      determining a distance between that point of intersection and another point of intersection; and
      determining whether to include that point of intersection in the main set of points of intersection based on the determined distance for that point of intersection.

31. The method as claimed in claim 1, wherein the main set of points of intersection is determined using a clustering method.

32. The method as claimed in claim 1, wherein the main set of points of intersection is determined by:
   determining a central point based on the location of all points of intersection;
   for each point of intersection:
      determining, a distance between that point of intersection and the determined central point; and
      determining whether to include that point of intersection in the main set of points of intersection based on the determined distance for that point of intersection.

* * * * *